No. 672,086. Patented Apr. 16, 1901.
W. H. UHLAND.
APPARATUS FOR MAKING STARCH.
(Application filed Sept. 18, 1899.)

(No Model.) 2 Sheets—Sheet 1.

Witnesses:
J. O. McMahon.
G. S. Noble.

Inventor,
Wilhelm Heinrich Uhland
by B. Singer.
Att'y.

THE NORRIS PETERS CO., PHOTO-LITHO., WASHINGTON, D. C.

No. 672,086. Patented Apr. 16, 1901.
W. H. UHLAND.
APPARATUS FOR MAKING STARCH.
(Application filed Sept. 18, 1899.)
(No Model.) 2 Sheets—Sheet 2.
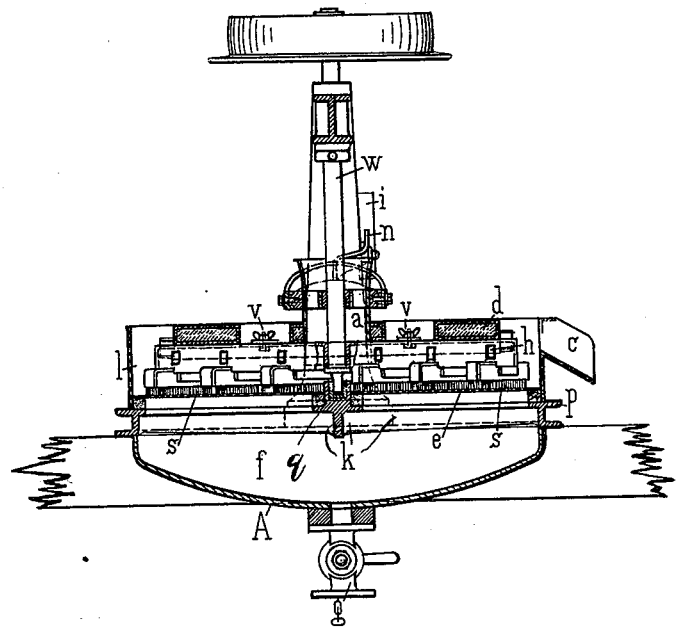
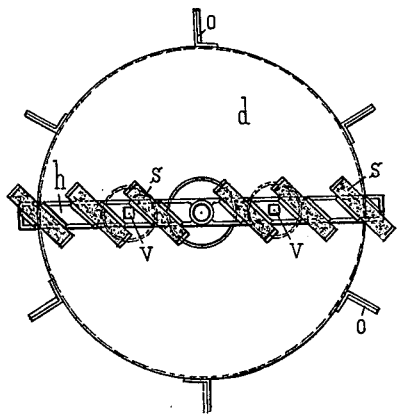
Witnesses:
J. D. McMahon
G. S. Noble
Inventor,
Wilhelm Heinrich Uhland
by B. Singer
Att'y.

UNITED STATES PATENT OFFICE.

WILHELM HEINRICH UHLAND, OF LEIPSIC-GOHLIS, GERMANY.

APPARATUS FOR MAKING STARCH.

SPECIFICATION forming part of Letters Patent No. 672,086, dated April 16, 1901.

Application filed September 18, 1899. Serial No. 730,850. (No model.)

*To all whom it may concern:*

Be it known that I, WILHELM HEINRICH UHLAND, a subject of the King of Saxony, residing at No. 13 Lindenstrasse, Leipsic-Gohlis, in the Kingdom of Saxony, German Expire, have invented certain new and useful Improvements in Apparatus for Extracting Starchy Substances, of which the following is a specification.

This invention relates to apparatus by which the starch contained in starchy raw materials may be extracted from said materials upon first reducing them to small pieces and then mixing with water, so as to form a kind of pulp, or otherwise reducing them to a liquid or semiliquid condition.

The object of the invention is to separate the starch from the pulp or liquid without any application of jets of water and solely in consequence of the different specific weights between the particles of raw material.

The invention consists in various combinations of mechanism and features of construction adapted to the aforesaid end, all of which will be understood from the ensuing description, taken in connection with the accompanying drawings, in which—

Figure 1:
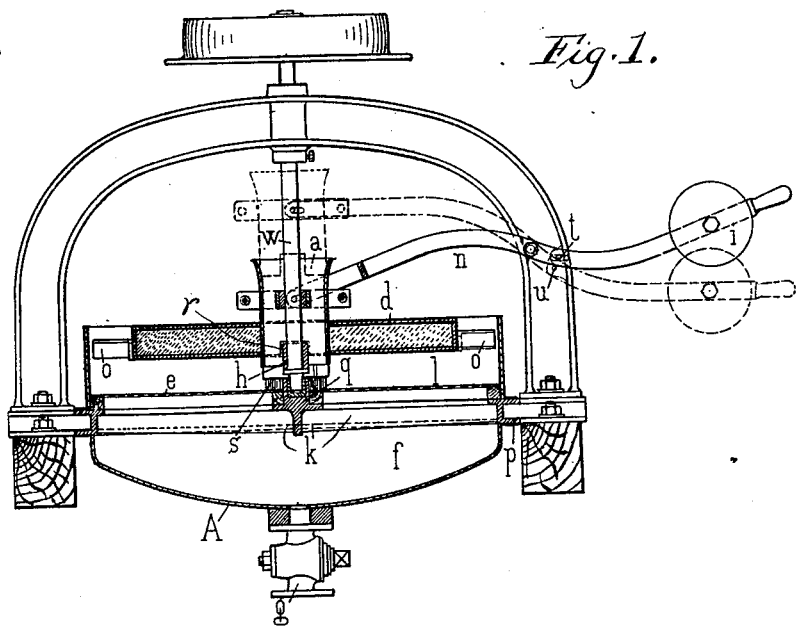
Figure 2:
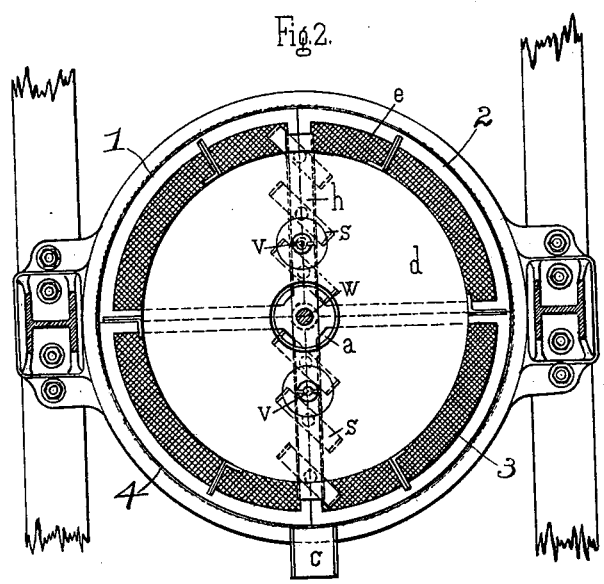

Figure 1 is a sectional elevation of a machine embodying my invention; Fig. 2, a top plan view with the frame broken away and certain superposed parts removed to more clearly expose the effective elements; Fig. 3, a sectional elevation of said machine on a line at right angles to that on which the first view is taken, and Fig. 4 a detached bottom view of the floatable disk and the brushes connected therewith.

A designates a tank or liquid-receptacle provided at the apex of its concaved bottom with a draw-off pipe and adjustable cut-off valve $g$, whereby the concentrated starch may be withdrawn at proper intervals. This receptacle is divided by a horizontal sieve $e$ into two compartments $l$ and $f$, located one above the other. The upper compartment serves for the extraction of the raw material or its separation from the starch, while the lower compartment serves as a collecting vessel for the starch-containing liquor. The separation is due to the difference in the specific weights of the particles of fiber and starch, there being, strictly speaking, no mechanical means for working the material during the time in which the reduced parts are moved over the sieve, this latter movement being brought about by the pressure of the column of mixture entering the apparatus through funnel $a$, located centrally over the sieve, although brushes may be employed to keep the meshes of the sieve open, as will hereinafter appear, and will in their movement incidentally promote the circulation of the liquor in the upper compartment.

Arranged in position to rest upon the surface of the liquid in the upper compartment $l$ is a discular body $d$, which is preferably hollow, so as to have considerable buoyancy. This disk is somewhat less in diameter than the diameter of the tank, so as to leave an annular space around its periphery, in which the refuse of the raw material may rise, and covering, as it does, a comparatively large area of the surface of the liquid it serves to quiet or still it and prevent undue agitation. The periphery of the disk is provided with radial wings $o$, which extend into close proximity with the wall of the tank and, the disk being slowly rotated during the separation of the starch, serve to sweep the refuse and scum collected in said annular space before them and direct it to the overflow $c$, by which it is conducted away. The above-mentioned funnel $a$ passes centrally through the disk and is supported thereby or secured thereto.

The tank and its immediate accessories are supported upon an annular base-plate $p$, comprising intersecting arms $k$, which carry axially thereof the step $q$ for the vertical shaft $w$, by which the moving parts are driven. The base-plate and its arms serve also as a support for the sieve, which, as shown in Fig. 2, consists of several parts connected with each other through the interposition of said arms—to wit, four segmental parts 1, 2, 3, and 4 in the present instance.

The vertical driving-shaft is provided with oppositely-extending arms $h$, lying horizontally over and above the sieve, and these arms carry vertically-adjustable brushes $s$, arranged obliquely, as shown in Fig. 2, so as to overlap and to sweep from the center toward the circumference of the sieve. By their vertical adjustment, as indicated at 5, compensation may be obtained for the different speeds at which they travel, according to position nearer to or farther from the driving-shaft, and for the different degrees of wear and tear to which they are subjected.

The hollow disk is recessed along its bottom, as at $r$, to sit over and couple with the parallel bars of the arms $h$, yet so that it may rise buoyantly within certain limits without becoming uncoupled. Bolts and nuts $v$, uniting it to said arms, may be employed to determine the limit to which it shall be upborne by the liquid contents of the tank.

In order to gain access to the brushes to control their work and to clean or exchange the sieve-sections, the disk $d$, with the attached funnel, is supported upon the inner end of a lever $n$, the outer arm of which carries a counterpoise $i$, so that these parts may be lifted with little exertion into the position indicated by dotted lines in Fig. 1 and there retained by inserting the key $t$ through the lever and into the recess $u$ in the frame.

Assuming the apparatus to be at regular work and completely filled, the raw material that has been reduced to small pieces and diluted with water enters through the funnel and circulates upon the sieve below the hollow disk. As the tank is completely filled with liquor, the incoming currents cannot get through the sieve; but the whole mass is in a rather buoyant state and glides along the sieve while swept around the tank by the brushes, thus traveling a spiral and comparatively long path from the center to the periphery of the apparatus. While making this journey the starchy particles are separated from the fibrous raw material in such a way that the specifically-heavier particles of starch sink down in the liquor and pass through the meshes of the sieve into the lower compartment of the tank, whereas the lighter fibrous parts remain in the liquor to be eventually swept by the wings of the hollow disk to the discharge-spout.

Having thus described my invention, what I claim, and desire to secure by Letters Patent, is—

1. The combination of the tank, the sieve dividing it into an upper and a lower compartment, the draw-off pipe, and the floating revolving disk in contact with the surface of the charge in the upper compartment to quiet or still it, and covering said tank with the exception of an annular space adjoining the walls thereof.

2. The combination of the tank, the sieve dividing it into upper and lower compartments, the buoyant disk in the upper compartment, the discharge-spout in said compartment, and the draw-off pipe in the lower compartment.

3. The combination of the tank, the horizontal sieve dividing it into upper and lower compartments, the buoyant disk in the upper compartment, the radial wings on the periphery of said disk, the discharge-spout, and means for revolving the disk.

4. The combination of the tank, the horizontal sieve dividing it into upper and lower compartments, the buoyant disk, the funnel passing centrally therethrough, the wings on said disk, and the obliquely-arranged brushes.

5. The combination of the tank, the horizontal sieve, the vertical driving-shaft and its horizontally-extending arms, and the buoyant disk coupled to said arms in such manner that it may move vertically.

6. The combination of the tank, the horizontal sieve, the buoyant disk, the funnel secured centrally of said disk, the lifting-lever and the counterpoise.

In witness whereof I have hereunto set my hand in presence of two witnesses.

WILHELM HEINRICH UHLAND.

Witnesses:
RUDOLPH FRICKE,
FERDINAND WILCKE.